(12) United States Patent
Durali et al.

(10) Patent No.: US 8,697,822 B2
(45) Date of Patent: Apr. 15, 2014

(54) POLYMERIZATION OF FLUOROPOLYMERS USING NON-FLUORINATED SURFACTANTS

(75) Inventors: Mehdi Durali, West Chester, PA (US); Lotfi Hedhli, King of Prussia, PA (US); Ramin Amin-Sanayei, Collegeville, PA (US)

(73) Assignee: Arkema Inc., King of Prussia, PA (US)

( * ) Notice: Subject to any disclaimer, the term of this patent is extended or adjusted under 35 U.S.C. 154(b) by 224 days.

(21) Appl. No.: 11/995,593

(22) PCT Filed: Jun. 26, 2006

(86) PCT No.: PCT/US2006/024704
§ 371 (c)(1),
(2), (4) Date: Aug. 15, 2008

(87) PCT Pub. No.: WO2007/018783
PCT Pub. Date: Feb. 15, 2007

(65) Prior Publication Data
US 2009/0221776 A1   Sep. 3, 2009

Related U.S. Application Data

(60) Provisional application No. 60/706,464, filed on Aug. 8, 2005.

(51) Int. Cl.
*C08L 27/16* (2006.01)

(52) U.S. Cl.
USPC .......... 526/193; 524/710; 524/711; 524/745; 524/777; 524/805; 526/216; 526/225; 526/247; 526/249; 526/250; 526/254; 526/255

(58) Field of Classification Search
USPC ......... 524/123, 157, 165, 166, 284, 300, 301, 524/544–546, 710, 711, 745; 526/179, 193, 526/255
See application file for complete search history.

(56) References Cited

U.S. PATENT DOCUMENTS

| | | | | |
|---|---|---|---|---|
| 3,404,111 | A * | 10/1968 | McNay | 524/764 |
| 3,644,259 | A * | 2/1972 | Kobylak | 524/297 |
| 3,931,131 | A * | 1/1976 | Noziri et al. | 526/62 |
| 4,598,111 | A * | 7/1986 | Wright et al. | 524/40 |
| 4,670,505 | A * | 6/1987 | Craig | 524/704 |
| 5,616,645 | A * | 4/1997 | Kuwamura et al. | 524/546 |
| 5,898,056 | A * | 4/1999 | Josephy et al. | 524/834 |
| 6,153,675 | A * | 11/2000 | Yamamoto et al. | 524/58 |
| 6,166,141 | A * | 12/2000 | Maeda et al. | 525/199 |
| 6,429,239 | B1 * | 8/2002 | Eck et al. | 524/5 |
| 6,825,250 | B2 | 11/2004 | Epsch et al. | |
| 6,841,616 | B2 | 1/2005 | Wille et al. | |
| 6,869,997 | B2 | 3/2005 | Wille et al. | |
| 7,276,254 | B2 | 10/2007 | Burns et al. | |
| 2003/0211035 | A1 * | 11/2003 | Burns et al. | 424/1.11 |

* cited by examiner

*Primary Examiner* — Nicole M Buie-Hatcher
(74) *Attorney, Agent, or Firm* — Thomas F. Roland

(57) ABSTRACT

The present invention relates to a method for the polymerization in an aqueous medium of monomers, and especially of fluoromonomers, using non-fluorinated surfactants; and the fluoropolymers formed therefrom. Specifically, the method of the polymerization uses one or more non-fluorinated surfactants selected from the group consisting of polyvinylphosphonic acid, polyacrylic acids, polyvinyl sulfonic acid, and salts thereof. Additionally, the use of polyvinylphosphonic acid, polyacrylic acids, polyvinyl sulfonic acid as surfactants in aqueous free radical polymerization is also novel.

16 Claims, No Drawings

POLYMERIZATION OF FLUOROPOLYMERS USING NON-FLUORINATED SURFACTANTS

This application claims benefit, under U.S.C. §119 or §365 of U.S. Provisional Application No. 60/706,464, filed Aug. 8, 2005; and PCT/US2006/024704 filed Jun. 26, 2006.

FIELD OF THE INVENTION

The present invention relates to a method for the polymerization in an aqueous medium of monomers, and especially of fluoromonomers, using non-fluorinated surfactants; and the fluoropolymers formed therefrom. Specifically, the method of the polymerization uses one or more non-fluorinated surfactants selected from the group consisting of polyvinylphosphonic acid, polyacrylic acids, polyvinyl sulfonic acid, and salts thereof. Additionally, the use of polyvinylphosphonic acid, polyacrylic acids, polyvinyl sulfonic acid as surfactants in aqueous free radical polymerization is also novel.

BACKGROUND OF THE INVENTION

Fluoropolymers are primarily produced via heterogeneous polymerization reactions, including suspension, emulsion and microemulsion systems. Generally, each of these reactions requires at least one monomer and a radical initiator in a suitable reaction medium. In addition, emulsion polymerizations of halogen-containing monomers generally require a surfactant capable of emulsifying both the reactants and the reaction products for the duration of the polymerization reaction. The surfactant of choice in the synthesis of fluoropolymers is generally a perfluoroallyl surfactant. The most common perfluoroalkyl surfactant in the production of halogenated polymers is ammonium perfluorooctanoate (AFPO).

The emulsion polymerization of vinylidene fluoride ($VF_2$) using a fluorinated surfactant and isopropyl peroxydicarbonate (IPP) as a free-radical initiator, is taught in U.S. Pat. No. 3,475,396. This polymerization process has since been refined to provide polymers having various improved properties. See U.S. Pat. Nos. 3,857,827; 4,076,929; 4,360,652; 4,569,978; 6,187,885.

Fluorosurfactants are expensive, specialized materials, however. In addition, because of their high stability, they tend to persist in the environment. Because of their resistance to chemical degradation, fluoroalkyl surfactants have the potential to accumulate in the environment and in organisms. Also, the high degree of fluorination of the surfactant avoids atom transfer between a growing polymer chain and the surfactant during polymerization, which will result in lowered molecular weights in the product and likely inhibition of the reaction.

New polymerization processes are needed that utilize non-perfluoroalkyl surfactants or reduced amounts of perfluoroalkyl surfactants. In order to address this issue, several different approaches have attempted to reduce or eliminate the use of perfluoroallyl surfactants in the polymerization of halogen-containing monomers.

Some emulsion polymerization processes have been demonstrated which employ partially fluorinated surfactants instead of perfluorinated surfactants. See U.S. Pat. Nos. 4,524,197; 5,763,552. Another attempt to reduce the amount of perfluoroalkyl surfactant in heterogeneous polymerization involved a protocol wherein a conventional fluorinated surfactant was added in combination with a non-fluorinated hydrocarbon surfactant. However, this modification served to substantially lower the rate of the reaction. See, WO 95-08598A, the entire disclosure of which is incorporated herein by reference.

Another attempt to reduce the amount of perfluoroalkyl surfactant in heterogeneous polymerization involved a protocol wherein a conventional fluorinated surfactant was added in combination with a non-fluorinated hydrocarbon surfactant. However, this modification served to substantially lower the rate of the reaction. See, WO 95-08598A, the entire disclosure of which is incorporated herein by reference.

U.S. Pat. No. 2,559,752 assigned to E.I. du Pont de Nemours relates to an "Aqueous colloidal dispersions of polymers". Stable aqueous colloidal dispersions of polymerized ethylenically unsaturated. organic compounds. are obtained by carrying out the polymerization in the presence of a $H_2O$-soluble polymerization initiator, such as an alkali persulfate or an aliphatic azo compound (cf. U.S. Pat. No. 2,471,959, C.A. 43, 6002 g), and a polyfluorinated ionizable dispersing agent (I). The I is taken from various groups of compounds including:

polyfluoroalkanoic acids, $X(CF_2)nCO_2H$, polyfluoroalkyl di-H phosphates, X(CF2)nCH2OPO(OH)2 [obtainable from X(CF2)nCH2OH and P2O5 or POCl3), and their NH4 or alkali-metal salts];

polyfluoroalkyl H sulfates, $X(CF_2)nCH_2OSO_3H$ and their NH4 or alkali-metal salts;

polyfluoro alkane phosphonic acids, H(CF2)nPO(OH)$_2$ [obtainable from $C_2F_4$ and a dialkyl phosphite in the presence of a free-radical producing catalyst, followed by hydrolysis] and their $NH_4$ or Na salts.

U.S. Pat. No. 6,869,997, incorporated herein by reference, describes the use of a 3-allyloxy-2-hydroxy-1-propane-sulfonic acid salt as the surfactant in the preparation of a fluoropolymer.

U.S. Pat. No. 6,841,616 incorporated herein by reference, describes the use of a siloxane based surfactant as the surfactant in the preparation of a fluoropolymer.

None of the art described above mentions the use of non-fluorinated polyvinyl phosphonic acids, polyacrylic acids, polyvinyl sulfonic acid or their salts as surfactants in the synthesis of fluorinated polymers.

Surprisingly it was found that polyvinyl phosphonic acid, polyacrylic acids, polyvinyl sulfonic acid or their salts could be used as surfactants in the aqueous-based synthesis of polymers, and especially of fluorinated polymers, and thereby eliminate or significantly reduce the use of fluorinated surfactants.

SUMMARY OF THE INVENTION

The invention relates to a process for preparing a fluoropolymer in an aqueous reaction medium comprising:

a) forming an aqueous emulsion comprising at least one radical initiator, at least one non-flourinated surfactants, and at least one fluoromonomer, and b) initiating polymerization of said fluoromonomer, wherein said non-fluorinated surfactant is selected from the group consisting of polyvinylphosphonic acid, polyacrylic acid, polyvinyl sulfonic acid, and the salts thereof.

The invention further relates to a fluoropolymer resin formed in an aqueous medium using non-fluorinated surfactant selected from the group consisting of polyvinylphosphonic acid, polyacrylic acid, polyvinyl sulfonic acid, and the salts thereof.

DETAILED DESCRIPTION OF THE INVENTION

The invention relates to the polymerization of fluoropolymers using as the surfactant polyvinylphosphonic acid, polyacrylic acids, and/or polyvinyl sulfonic acid, and the salts thereof.

In the process of the invention, a polymerization reaction is carried out by charging a reactor with water (preferably deionized water), at least one non-fluorinated surfactant, at least one monomer, preferably at least one fluoromonomer, and optionally, a chain-transfer agent and an antifoulant. Air may be purged from the reactor prior to the introduction of the fluoromonomer. Water is added to the reactor before bringing the reactor to the desired starting temperature, but the other materials may be added before or after bringing the reactor to temperature. At least one radical initiator is added to start and maintain the polymerization reaction. Additional monomer may be optionally added to replenish monomer that is consumed, and the other materials may be optionally added during the course of the polymerization to maintain the reaction and control the final product properties.

Surfactant

The term "surfactant" means a type of molecule which has both hydrophobic and hydrophilic portions, which allows it to stabilize and disperse hydrophobic molecules and aggregates of hydrophobic molecules in aqueous systems. The poly acids of the invention include the acid, as well as the fully or partially neutralized acids, preferably as the ammonium or sodium salts.

Polyacrylic acid, includes both polyacrylic acid and polymethacrylic acid.

The polyacrylic acid, polyvinyl sulfonic acid and polyvinyl phosphonic acid surfactants are used at from 0.001-2 wt %, preferably 0.001-0.5 wt %, base on total monomer.

The alkyl phosphonic acid, polyphosphonic acid, polyacrylic acid, and polyvinyl sulfonic acid surfactants and their salts of the invention are all water-soluble or water-dispersible, low molecular weight molecules.

The polyvinyl phosphonic acid, polyacrylic acid, and polyvinyl sulfonic acid surfactants of the invention includes copolymers of the acids with one or more other ethylenically unsaturated monomers, and the copolymer itself must be water soluble or water dispersible.

Other co-surfactants can also be used with polyvinyl phosphonic acid, polyacrylic acid, and polyvinyl sulfonic acid surfactants of the invention. Preferred co-surfactants are non-fluorinated hydrocarbon surfactants, a siloxane surfactant or a combination thereof.

Monomers

The monomers useful in the aqueous-based polymerization of the invention using polyvinyl phosphonic acid, polyacrylic acid, and polyvinyl sulfonic acid surfactants, are any ethylenically unsaturated monomers. Useful monomers include, but are not limited to acrylic acid and acrylic esters such as alkyl(meth)acrylates, vinyl esters such as vinyl acetate, vinyl propionate, vinyl butyrate, vinyl benzoate, maleic esters such as dimethyl maleate, diethyl maleate, di-n-propyl maleate, diisopropyl maleate, di-2-methoxyethyl maleate, fumaric esters such as dimethyl fumarate, diethyl fumarate, di-n-propyl fumarate, diisopropyl fumarate, styrene, vinyltoluene, alpha-methylstyrene and acrylonitrile. anhydrides, vinyl esters, alpha-olefins, substituted or unsubstituted mono and dialkyl esters of unsaturated dicarboxylic acids, vinyl aromatics, cyclic monomers, Fluoromonomers The term "fluoromonomer" or the expression "fluorinated monomer" means a polymerizable alkene which contains at least one fluorine atom, fluoroalkyl group, or fluoroalkoxy group attached to the double bond of the alkene that undergoes polymerization. The term "fluoropolymer" means a polymer formed by the polymerization of at least one fluoromonomer, and it is inclusive of homopolymers, copolymers, terpolymers and higher polymers which are thermoplastic in their nature, meaning they are capable of being formed into useful pieces by flowing upon the application of heat, such as is done in molding and extrusion processes. The fluoropolymer preferably contains at least 50 mole percent of one or more fluoromonomers. The thermoplastic polymers typically exhibit a crystalline melting point.

Fluoromonomers useful in the practice of the invention include, for example, vinylidene fluoride ($VF_2$), tetrafluoroethylene (TFE), trifluoroethylene, chlorotrifluoroethylene (CTFE), hexafluoropropene (HFP), vinyl fluoride, hexafluoroisobutylene, perfluorobutylethylene (PFBE), pentafluoropropene, 3,3,3-trifluoro-1-propene, 2-trifluoromethyl-3,3,3-trifluoropropene a fluorinated vinyl ether, a fluorinated allyl ether, a non-fluorinated allyl ether, a fluorinated dioxole, and combinations thereof.

Especially preferred copolymers made by the process of the invention are copolymers comprising from about 71 to about 99 weight percent VDF, and correspondingly from about 1 to about 29 percent TFE; from about 71 to 99 weight percent VDF, and correspondingly from about 1 to 29 percent HFP (such as disclosed in U.S. Pat. No. 3,178,399); and from about 71 to 99 weight percent VDF, and correspondingly from about 1 to 29 weight percent trifluoroethylene. Especially preferred terpolymers are the terpolymer of VDF, HFP and TFE, and the terpolymer of VDF, trifluoroethene, and TFE. The especially preferred terpolymers have at least 10 weight percent VDF, and the other comonomers may be present in varying portions, but together they comprise up to 90 weight percent of the terpolymer.

Initiators

The term "initiator" and the expressions "radical initiator" and "free radical initiator" refer to a chemical that is capable of providing a source of free radicals, either induced spontaneously, or by exposure to heat or light. Examples of initiators include peroxides, peroxydicarbonates and azo compounds. The term expression also includes redox systems useful in providing a source of free radicals. The term "radical" and the expression "free radical" refer to a chemical species that contains at least one unpaired electron.

The radical initiator is added to the reaction mixture in an amount sufficient to initiate and maintain the polymerization reaction at a desired reaction rate. The order of addition may vary according to the desired process and latex emulsion characteristics.

The radical initiator may comprise a persulfate salt, such as sodium persulfate, potassium persulfate, or ammonium persulfate. The amount of persulfate salt added to the reaction mixture (based upon the total weight of monomer added to the reaction mixture) is from about 0.005 to about 1.0 weight percent.

The radical initiator may comprise an organic peroxide such as an alkyl, dialkyl, or diacyl peroxide, peroxydicarbonates, and peroxy esters in an amount from about 0.5 to about 2.5 weight percent on total monomer.

Chain-Transfer Agents

Chain-transfer agents are added to the polymerization to regulate the molecular weight of the product. They may added to a polymerization in a single portion at the beginning of the reaction, or incrementally or continuously throughout the reaction. The amount and mode of addition of chain-transfer agent depend on the activity of the particular chain-transfer agent employed, and on the desired molecular weight of the polymer product. The amount of chain-transfer agent added to the polymerization reaction is preferably from about 0.05 to about 5 weight percent, more preferably from about 0.1 to about 2 weight percent based on the total weight of monomer added to the reaction mixture.

Examples of chain transfer agents useful in the present invention include, but are not limited to oxygenated compounds such as alcohols, carbonates, ketones, esters, and ethers may serve as chain-transfer agents; halocarbons and hydrohalocarbons, such as chlorocarbons, hydrochlorocarbons, chlorofluorocarbons and hydrochlorofluorocarbons; ethane and propane.

Buffering Agent

The polymerization reaction mixture may optionally contain a buffering agent to maintain a controlled pH throughout the polymerization reaction. The pH is preferably controlled within the range of from about 4 to about 8, to minimize undesirable color development in the product.

Buffering agents may comprise an organic or inorganic acid or alkali metal salt thereof, or base or salt of such organic or inorganic acid, that has at least one $pK_a$ value and/or $pK_b$ value in the range of from about 4 to about 10, preferably from about 4.5 to about 9.5. Preferred buffering agents in the practice of the invention include, for example, phosphate buffers and acetate buffers. A "phosphate buffer" is a salt or salts of phosphoric acid. An "acetate buffer" is a salt of acetic acid.

Buffering agents are preferably employed where potassium persulfate is employed as the radical initiator. A preferred buffering agent for use with persulfate radical initiators is sodium acetate. A preferred amount of sodium acetate buffer is from about 50 wt. % to about 150 wt. %, based on the weight of persulfate initiator added to the reaction.

Antifoulant

The addition of a paraffin wax or hydrocarbon oil to the reaction serves as an antifouling to minimize or prevent polymer adhesions to the reactor components. Any long chain saturated hydrocarbon wax or oil can perform this function. The amount of oil or wax added to the reactor is an amount which serves to minimize the formation of polymer adhesions to the reactor components. The amount is generally proportional to the interior surface area of the reactor and may vary from about 1 to about 40 mg per square centimeter of reactor interior surface area. The amount of paraffin wax or hydrocarbon oil is preferably about 5 mg/cm$^2$ of the reactor interior surface area.

Polymerization Conditions

The temperature used for polymerization may vary from 20-160 degrees Celsius, depending on the initiator system chosen. The polymerization temperature is preferably from 35-130 degrees Celsius, and most preferably from 65-130 degrees Celsius. In one embodiment, the temperature is varied during the reaction.

The pressure used for polymerization may vary from 280-20,000 kPa, depending on the capabilities of the reaction equipment, the initiator system chosen, and the monomer selection. The polymerization pressure is preferably from 2,000-11,000 kPa, and most preferably from 2,750-6,900 kPa.

The polymerization occurs under stirring. The stirring may be constant, or may be varied to optimize process conditions during the course of the polymerization. In one embodiment, both multiple stirring speeds and multiple temperatures are used for controlling the reaction.

According to one embodiment of the process of the invention, a pressurized polymerization reactor equipped with a stirrer and heat control means is charged with water, preferably deionized water, one or more of the surfactants of the invention and at least one fluoromonomer. The mixture may optionally contain one or more of an additional non-fluorinated surfactant, a buffering agent, an antifoulant and a chain-transfer agent for molecular weight regulation of the polymer product.

Prior to introduction of the monomer or monomers, air is preferably removed from the reactor in order to obtain an oxygen-free environment for the polymerization reaction.

The order in which the polymerization components are assembled may be varied, provided that the surfactant of the invention is present in the aqueous reaction medium prior to the initiation of the polymerization of the fluoromonomer.

In one embodiment, water, initiator, surfactant and optionally antifoulant, chain transfer agent and buffer are charged to the reactor, and the reactor heated to the desired reaction temperature. The monomer(s) is then fed into the reactor, preferably at a rate which provides an essentially constant pressure.

Alternatively the monomer and initiator can be fed to the reactor, along with one or more of the optional ingredients. Other variations for fluoropolymer polymerization processes are anticipated, as known in the art.

The reactor pressure is primarily regulated by controlling the feed of gaseous monomer to the reaction. The reaction pressure is typically from about 280 to about 20,000 kPa, preferably from about 2,000 to about 11,000 kPa, more preferably from about 2,750 to about 6,900 kPa.

The monomer feed is terminated when the desired weight of monomer has been fed to the reactor. Additional radical initiator is optionally added, and the reaction is allowed to react out for a suitable amount of time. The reactor pressure drops as the monomer within the reactor is consumed.

Upon completion of the polymerization reaction, the reactor is brought to ambient temperature and the residual unreacted monomer is vented to atmospheric pressure. The aqueous reaction medium containing the polymer (fluoropolymer) is then recovered from the reactor as a latex. The latex consists of a stable mixture of the reaction components, i.e., water, surfactant, initiator (and/or decomposition products of the initiator) and fluoropolymer solids.

Generally, the latex contains from about 10 to about 50 weight percent polymer solids. The polymer in the latex is in the form of small particles having a size range of from about 30 nm to about 500 nm.

The product of the polymerization is a latex which can be used in that form, usually after filtration of solid byproducts from the polymerization process, or which can be coagulated to isolate the solids, which may then be washed and dried. For use in latex form, the latex can be stabilized by the addition of further surfactant, which may be the same or a different ionic surfactant, or may be of a different type, such as an non-ionic surfactant. For solid product, the latex may be coagulated mechanically or by the addition of salts or acids, and then isolated by well-known means such as by filtration. Once isolated, solid product can be purified by washing or other techniques, and it may be dried for use as a powder, which can be further process into granules.

EXAMPLES

Examples 1-4

Vinylidene fluoride homopolymer was made using polyacrylic acid surfactant with potassium persulfate initiator. The experiments were carried out in a 25 ml reactor (Endeavor reactor from Argonaut) in Which were added 480 micro liter of a 0.25 wt % aqueous surfactant solution (i.e 300 ppm) and 250 micro liter of a 1 wt % aqueous solution of potassium persulfate (i.e 625 ppm). Then deionized water was added to bring the total reactor charge to 4 g. The reactor was purged with nitrogen gas. The reactor was sealed, and agitation is started at 500 rpm. Agitation was maintained throughout the experiment. The reactor was heated to 83° C. The reactor was charged with vinylidene fluoride till the pressure reached was 490 psi. The reaction temperature was held at 83° C., and the reaction pressure was maintained at 490 psi by adding vinylidene fluoride as needed. When the amount of $VF_2$ consumed reached the desired level the $VF_2$ feed was stopped. For a period of 30 minutes, agitation was continued and the temperature was maintained. The agitation and heating were discontinued. After cooling to room temperature, surplus gas was vented, and the latex was recovered. Gravimetric solids measurements of the latex were done. The Examples are summarized in Table 1.

TABLE 1

Examples of polyacrylic acid used as surfactant in VDF polymerization.

| Example number | Surfactant PAA | Co-surfactant | Initiator amount | Solids achieved Wt % |
|---|---|---|---|---|
| 1 | 300 ppm | — | 625 ppm | 27.4 |
| 2 | 300 ppm | — | 625 ppm | 25.8 |
| 3 | 100 ppm | — | 625 ppm | Coag. |
| 4 | 100 ppm | L 7210; 100 ppm | 625 ppm | 16.5 |

Coag = latex coagulated.
L7210 is a surfactant from Rhodia and was used as received Example 5

Polyvinylidene Fluoride was made using Poly Acrylic Acid Surfactant and Potassium Persulfate (KPS) Initiator. Deionized water was used. Reagents were of ACS reagent grade quality unless stated otherwise. Polyacrylic acid was received as a 45 wt % solution. To a 7.5 liter, stainless steel reactor was added 4030 g of water, 4 g of paraffin wax, 100.0 g of an aqueous surfactant solution 1.26 wt % in polyacrylic acid, and 100 g of an aqueous initiator solution 1.2 wt. % in potassium persulfate and 0.72 wt. % in sodium acetate. The mixture was purged with argon and agitated for 0.5 hours. The reactor was sealed, agitation was continued, and the reactor was heated to 121 degrees Celsius. The reactor was charged with 362 g of vinylidene fluoride to a pressure of 4454 kPa·17 g of initiator solution was first charged at 240 g/hr followed by a steady feed of initiator solution at a rate of about 60.0 g/h. The reaction temperature was held at 121 degrees Celsius, and the reaction pressure was maintained at 4480 kPa by adding as needed vinylidene fluoride. After 1.65 hours, the feed of vinylidene fluoride was stopped. An amount of vinylidene fluoride, 2202 g, had been added to the reactor. For a period of 0.3 hours, agitation was continued, the temperature was maintained, and the feed of aqueous initiator solution was continued. The feed of aqueous initiator was stopped, and then for a period of 0.17 hours, agitation and the reaction temperature were maintained. The agitation and heating were discontinued. After cooling to room temperature, surplus gas was vented, and the reactor was emptied of latex through a stainless steel mesh. About 1.0 wt. % coagulum had formed during the reaction. Gravimetric solids measurements of the latex showed the solid polymer yield to be 88.5 wt % based on the weight of the vinylidene fluoride fed to the reactor. The amount of potassium persulfate, which was used to convert the monomer to polymer, was 0.13 wt %, based on the weight of vinylidene fluoride monomer.

Example 6

Polyvinylidene Fluoride was made using Poly Acrylic Acid Surfactant and Potassium Persulfate (KPS) Initiator. Deionized water was used. Reagents were of ACS reagent grade quality unless stated otherwise. Polyacrylic acid was received as a 45 wt % solution. To a 7.5 liter, stainless steel reactor was added 4330 g of water, 4 g of paraffin wax, and 100.0 g of an aqueous surfactant solution 1.31 wt % in polyacrylic acid. The mixture was purged with argon and agitated for 0.5 hours. The reactor was sealed, agitation was continued, and the reactor was heated to 121 degrees Celsius. The reactor was charged with 362 g of vinylidene fluoride to a pressure of 4454 kPa·19 g of an aqueous initiator solution 1.2 wt. % in potassium persulfate and 0.72 wt. % in sodium acetate was first charged at 120 g/hr followed by a steady feed of initiator solution at a rate of about 60.0 g/h. After 75 min into the run, initiator solution feed rate was dropped to 36 g/h and maintained throughout the rest of the reaction. The reaction temperature was held at 121 degrees Celsius, and the reaction pressure was maintained at 4480 kPa by adding as needed vinylidene fluoride. After 1.87 hours, the feed of vinylidene fluoride was stopped. An amount of vinylidene fluoride, 2204 g, had been added to the reactor. For a period of 0.3 hours, agitation was continued, the temperature was maintained, and the feed of aqueous initiator solution was continued. The feed of aqueous initiator was stopped, and then for a period of 0.17 hours, agitation and the reaction temperature were maintained. The agitation and heating were discontinued. After cooling to room temperature, surplus gas was vented, and the reactor was emptied of latex through a stainless steel mesh. 0.54 wt. % coagulum had formed during the reaction. Gravimetric solids measurements of the latex showed the solid polymer yield to be 98.0 wt % based on the weight of the vinylidene fluoride fed to the reactor. The amount of potassium persulfate, which was used to convert the monomer to polymer, was 0.071 wt %, based on the weight of vinylidene fluoride monomer.

Example 7

Polyvinylidene Fluoride was made using Poly Acrylic Acid Surfactant and Potassium Persulfate (KPS) Initiator. Deionized water was used. Reagents were of ACS reagent grade quality unless stated otherwise. Polyacrylic acid was received as a 45 wt % solution. To a 7.5 liter, stainless steel reactor was added 4330 g of water, 4 g of paraffin wax, and 100.0 g of an aqueous surfactant solution 0.63 wt % in polyacrylic acid. The mixture was purged with argon and agitated for 0.5 hours. The reactor was sealed, agitation was continued, and the reactor was heated to 121 degrees Celsius. The reactor was charged with 432 g of vinylidene fluoride to a pressure of 4454 kPa·13 g of an aqueous initiator solution 1.2 wt. % in potassium persulfate and 0.72 wt. % in sodium acetate was first charged at 72 g/hr followed by a steady feed of initiator solution at a rate of about 36.0 g/h. After 90 min into the run, initiator solution feed rate was dropped to 24 g/h and maintained throughout the run. The reaction temperature was held at 121 degrees Celsius, and the reaction pressure was maintained at 4480 kPa by adding as needed vinylidene fluoride. After 1.87 hours, the feed of vinylidene fluoride was stopped. An amount of vinylidene fluoride, 2204 g, had been added to the reactor. For a period of 0.3 hours, agitation was continued, the temperature was maintained, and the feed of aqueous initiator solution was continued at 12 g/h. The feed of aqueous initiator was stopped, and then for a period of 0.17 hours, agitation and the reaction temperature were maintained. The agitation and heating were discontinued. After cooling to room temperature, surplus gas was vented, and the reactor was emptied of latex through a stainless steel mesh. 0.92 wt. % coagulum had formed during the reaction. Gravimetric solids measurements of the latex showed the solid polymer yield to be 93.0 wt % based on the weight of the vinylidene fluoride fed to the reactor. The amount of potassium persulfate, which was used to convert the monomer to polymer, was 0.045 wt %, based on the weight of vinylidene fluoride monomer.

Example 8

Polyvinylidene Fluoride was made using a mixed polyacrylic acid and T-5863 Polysiloxane surfactant and Potassium Persulfate (KPS) as Initiator. Deionized water was used. Reagents were of ACS reagent grade quality unless stated otherwise. Polyacrylic acid was received as a 45 wt % solution and T-5863 was 100% pure. To a 7.5 liter, stainless steel reactor was added 4030 g of water, 4 g of paraffin wax, 100.0 g of an aqueous surfactant solution 0.41 wt % in polyacrylic acid and 1.9 wt. % in T-5863, and 350 g of an aqueous initiator solution 0.5 wt. % in potassium persulfate and 0.31 wt. % in sodium acetate. The mixture was purged with argon and agitated for 0.5 hours. The reactor was sealed, agitation was continued, and the reactor was heated to 82 degrees Celsius. The reactor was charged with 478 g of vinylidene fluoride to a pressure of 4454 kPa·64 g of initiator solution was first charged at 36 g/hr followed by a steady feed of initiator solution throughout the reaction. The reaction temperature was held at 121 degrees Celsius, and the reaction pressure was maintained at 4480 kPa by adding as needed vinylidene fluoride. After 2.6 hours, the feed of vinylidene fluoride was stopped. An amount of vinylidene fluoride, 2200 g, had been added to the reactor. For a period of 0.3 hours, agitation was continued, the temperature was maintained, and the feed of aqueous initiator solution was continued. The feed of aqueous initiator was stopped, and then for a period of 0.17 hours, agitation and the reaction temperature were maintained. The agitation and heating were discontinued. After cooling to room temperature, surplus gas was vented, and the reactor was emptied of latex through a stainless steel mesh. About 0.8 wt. % coagulum had formed during the reaction. Gravimetric solids measurements of the latex showed the solid polymer yield to be 90.3 wt % based on the weight of the vinylidene fluoride fed to the reactor. The amount of potassium persulfate, which was used to convert the monomer to polymer, was 0.104 wt %, based on the weight of vinylidene fluoride monomer.

TABLE 2

PVDF polymerization reactions using Polyacrylic acid as the sole surfactant. All concentrations are on VDF.

| Example Number | Surf. Conc. ppm | Initiator type | Initiator conc. ppm | Reaction Temp. ° C. | Solids Wt. % | Yield Wt. % | Coagulum wt. % |
|---|---|---|---|---|---|---|---|
| 5 | 572 | KPS | 1323 | 121 | 29.7 | 88.5 | 1.0 |
| 6 | 591 | KPS | 709 | 121 | 32.2 | 98.6 | 0.5 |
| 7 | 286 | KPS | 454 | 121 | 31.2 | 93.1 | 0.9 |

TABLE 3

PVDF polymerization reactions using Polyacrylic acid/T-5863 Polysiloxane mixed surfactants. All concentrations are on VDF.

| Example Number | PAA Conc. ppm | T-5863 conc. ppm | Initiator type | Initiator conc. ppm | Reaction Temp. ° C. | Solids Wt. % | Yield Wt. % | Coagulum wt. % |
|---|---|---|---|---|---|---|---|---|
| 8 | 184 | 864 | KPS | 1042 | 82 | 30.2 | 90.2 | 0.82 |

What is claimed is:

1. A process for preparing a polymer in an aqueous reaction medium comprising:
    a) forming an aqueous emulsion comprising at least one radical initiator, at least one non-fluorinated surfactant, and a monomer composition consisting of vinylidene fluoride and, optionally, one or more additional monomers selected from the group consisting of tetrafluoroethylene, trifluoroethylene, chlorotrifluoroethylene, hexafluoropropene, vinyl fluoride, hexafluoroisobutylene, perfluorobutylethylene, pentafluoropropene, 3,3,3-trifluoro-1-propene, 2-trifluoromethyl-3,3,3-trifluoropropene, fluorinated vinyl ethers, fluorinated allyl ethers, and fluorinated dioxoles, and
    b) initiating polymerization of said monomer composition to form a thermoplastic fluoropolymer latex,
wherein said non-fluorinated surfactant is selected from the group consisting of polyvinyl phosphonic acid, polyacrylic acid, polyvinyl sulfonic acid, and the salts thereof, and wherein said thermoplastic fluoropolymer comprises 71 to 100 weight percent vinylidene fluoride monomer, wherein no fluorinated surfactants are used in the process, and wherein said latex contains thermoplastic fluoropolymer in the form of particles having a size range of from about 30 nm to about 500 nm.

2. The process of claim 1, wherein said non-fluorinated surfactant is in the ammonium or sodium salt form.

3. The process of claim 1 wherein said polyacrylic acid is polyacrylic acid or polymethacrylic acid, and the salts thereof.

4. The process of claim 1 wherein said polyvinyl phosphonic acid, polyacrylic acid, polyvinyl sulfonic acid, or the salts thereof are present at from 0.001 to 2.0 percent, based on the total weight of monomer.

5. The process of claim 1 wherein said polyvinyl phosphonic acid, polyacrylic acid, polyvinyl sulfonic acid, or the salts thereof are present at from 0.005 to 0.5 percent, based on the total weight of monomer.

6. The process of claim 1 wherein said monomer composition consists of vinylidene fluoride.

7. The process of claim 1 wherein said thermoplastic fluoropolymer is a vinylidene fluoride copolymer comprising, in addition to vinylidene fluoride, at least one comonomer selected from the group consisting of tetrafluoroethylene, trifluoroethylene, hexafluoropropene, chlorotrifluoroethylene, vinyl fluoride, and combinations thereof.

8. The process of claim 1 wherein the aqueous emulsion is additionally comprised of at least one surfactant other than the non-fluorinated surfactant.

9. The process of claim 8 wherein the at least one surfactant other than the non-fluorinated surfactant is selected from the group consisting of non-fluorinated hydrocarbon surfactants and siloxane surfactants.

10. The process of claim 1 wherein the free radical initiator comprises a persulfate salt.

11. The process of claim 1 wherein the aqueous emulsion is additionally comprised of at least one antifoulant selected from the group consisting of paraffin waxes and hydrocarbon oils.

12. The process of claim 1 wherein the process produces a latex containing from about 10 to about 50 weight percent thermoplastic fluoropolymer solids.

13. The process of claim 1 wherein the aqueous emulsion does not contain any co-surfactant in addition to the non-fluorinated surfactant.

14. An aqueous fluoropolymer composition comprising:
a) at least one radical initiator,
b) at least one non-fluorinated surfactant; and
c) at least one thermoplastic fluoropolymer;
wherein said non-fluorinated surfactant is selected from the group consisting of polyphosphonic acid, polyacrylic acid, polyvinyl sulfonic acid, and the salts thereof, and wherein said thermoplastic fluoropolymer consists essentially of 71 to 100 weight percent vinylidene fluoride monomer and optionally one or more additional monomers selected from the group consisting of tetrafluoroethylene, trifluoroethylene, chlorotrifluoroethylene, hexafluoropropene, vinyl fluoride, hexafluoroisobutylene, perfluorobutylethylene, pentafluoropropene, 3,3,3-trifluoro-1-propene, 2-trifluoromethyl-3,3,3-trifluoropropene, fluorinated vinyl ethers, fluorinated allyl ethers, and fluorinated dioxoles and wherein the aqueous fluoropolymer composition is a stable latex, wherein said composition contains no fluorinated surfactant, and wherein said aqueous fluoropolymer composition is a latex having thermoplastic fluoropolymer in the form of particles having a size range of from about 30 nm to about 500 nm.

15. The aqueous fluoropolymer composition of claim 14 wherein the composition is a latex containing from about 10 to about 50 weight percent thermoplastic fluoropolymer solids.

16. The aqueous fluoropolymer composition of claim 14 wherein the aqueous fluoropolymer composition does not contain any co-surfactant in addition to the non-fluorinated surfactant.

* * * * *